United States Patent
Gawski et al.

(10) Patent No.: US 10,110,091 B2
(45) Date of Patent: Oct. 23, 2018

(54) ELECTRICITY GENERATION WITHIN A DOWNHOLE DRILLING MOTOR

(71) Applicant: HALLIBURTON ENERGY SERVICES, INC., Houston, TX (US)

(72) Inventors: Victor Gawski, Whitecairns (GB); John Snyder, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/912,333

(22) PCT Filed: Sep. 11, 2014

(86) PCT No.: PCT/US2014/055092
§ 371 (c)(1),
(2) Date: Feb. 16, 2016

(87) PCT Pub. No.: WO2016/039748
PCT Pub. Date: Mar. 17, 2016

(65) Prior Publication Data
US 2016/0276900 A1    Sep. 22, 2016

(51) Int. Cl.
*H02K 7/18*    (2006.01)
(52) U.S. Cl.
CPC .................................. *H02K 7/1823* (2013.01)
(58) Field of Classification Search
None
See application file for complete search history.

(56) References Cited

U.S. PATENT DOCUMENTS

| 2,944,603 | A | 7/1960 | Baker et al. |
| 3,036,645 | A | 5/1962 | Scott |
| 4,369,373 | A | 1/1983 | Wiseman |
| 4,415,823 | A | 11/1983 | Jurgens |
| 4,491,738 | A | 1/1985 | Kamp |

(Continued)

FOREIGN PATENT DOCUMENTS

| JP | 07194053 A | 7/1995 |
| JP | 2004084336 A | 3/2004 |

(Continued)

OTHER PUBLICATIONS

International Search Report and Written Opinion issued in related PCT Application No. PCT/US2014/055092, dated May 26, 2015 (12 pages).

(Continued)

*Primary Examiner* — Abdullah Riyami
*Assistant Examiner* — S. Mikailoff
(74) *Attorney, Agent, or Firm* — John Wustenberg; Baker Botts L.L.P.

(57) ABSTRACT

A progressing cavity-type drilling motor having an electrical generator disposed within the rotor of the drilling motor. In some embodiments, the electrical generator produces electrical energy from a flow of drilling fluid through a bore in the rotor. In other embodiments, the electrical generator produces electrical energy by harnessing the kinetic energy of the rotor as the drilling motor is used to drill into a formation. The electrical energy generated by the generator can be stored or used to power sensors, actuators, control systems, and other downhole equipment.

9 Claims, 5 Drawing Sheets

(56) References Cited

U.S. PATENT DOCUMENTS

| | | | |
|---|---|---|---|
| 4,654,537 A | | 3/1987 | Gaspard |
| 4,732,225 A | | 3/1988 | Jurgens et al. |
| 4,740,711 A | | 4/1988 | Sato et al. |
| 5,149,984 A | | 9/1992 | Schultz et al. |
| 5,248,896 A | | 9/1993 | Forrest |
| 5,517,464 A | | 5/1996 | Lerner et al. |
| 5,839,508 A | | 11/1998 | Tubel et al. |
| 6,011,346 A | | 1/2000 | Buchanan et al. |
| 6,109,372 A | * | 8/2000 | Dorel ................. E21B 7/06 175/269 |
| 6,672,409 B1 | | 1/2004 | Dock et al. |
| 7,002,261 B2 | | 2/2006 | Cousins |
| 7,133,325 B2 | | 11/2006 | Kotsonis et al. |
| 7,687,950 B2 | | 3/2010 | Kuckes |
| 7,757,781 B2 | | 7/2010 | Hay et al. |
| 7,814,993 B2 | | 10/2010 | White |
| 2009/0095528 A1 | * | 4/2009 | Hay ................. E21B 4/02 175/26 |
| 2009/0301784 A1 | * | 12/2009 | Hall ................. E21B 21/08 175/269 |
| 2010/0000793 A1 | * | 1/2010 | White ................. E21B 41/0085 175/57 |
| 2011/0150687 A1 | * | 6/2011 | Ree ................. F04C 2/1071 418/48 |
| 2011/0198848 A1 | | 8/2011 | Rytlewski et al. |
| 2012/0118646 A1 | * | 5/2012 | Russell ................. E21B 4/02 175/73 |
| 2012/0139250 A1 | * | 6/2012 | Inman ................. E21B 21/10 290/52 |
| 2013/0099500 A1 | * | 4/2013 | Heisig ................. H02K 7/18 290/52 |
| 2013/0277116 A1 | | 10/2013 | Knull et al. |
| 2014/0311806 A1 | * | 10/2014 | Bruder ................. E21B 41/0085 175/104 |
| 2015/0068298 A1 | * | 3/2015 | Inman ................. E21B 21/10 73/152.54 |
| 2015/0108767 A1 | * | 4/2015 | Winslow ................. E21B 3/00 290/1 C |
| 2015/0303771 A1 | * | 10/2015 | Downing ................. H02K 7/1823 290/50 |
| 2015/0376948 A1 | * | 12/2015 | Snyder ................. E21B 4/006 175/57 |
| 2016/0115738 A1 | * | 4/2016 | Samuel ................. E21B 3/00 175/57 |

FOREIGN PATENT DOCUMENTS

| | | |
|---|---|---|
| WO | 2012/122178 A2 | 9/2012 |
| WO | 2014/182318 A2 | 11/2014 |

OTHER PUBLICATIONS

International Preliminary Report on Patentability issued in related Application No. PCT/US2014/055092, dated Mar. 3, 2017 (9 pages).

\* cited by examiner

ELECTRICITY GENERATION WITHIN A DOWNHOLE DRILLING MOTOR

CROSS-REFERENCE TO RELATED APPLICATION

The present application is a U.S. National Stage Application of International Application No. PCT/US2014/055092 filed Sep. 11, 2014, which is incorporated herein by reference in its entirety for all purposes.

BACKGROUND

The present disclosure relates generally to electrical power generation during drilling operations.

Modern drilling operations commonly implement various pieces of downhole equipment that require electrical power. For example, sensors, control boards, drives, and logging tools are just some of the many pieces of common downhole electrical equipment.

Despite the pervasiveness of downhole electrical equipment, supplying power to the downhole equipment continues to challenge drilling operators. Increasingly deeper wellbores and increasingly harsher downhole conditions make direct connections to surface power sources challenging. Further, the duration of many drilling operations exceed the life of battery systems, requiring the replacement of batteries mid-operation. Because such replacement may require removal and rerunning of the drill string, it is costly, time-consuming, and risks damage to the wellbore.

In light of these issues there is a need for downhole power generation system for supplying electrical power to downhole equipment.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to wellbore operations and, more particularly, to downhole drilling motors with integrated electrical generators.

Illustrative embodiments of the present invention are described in detail herein. In the interest of clarity, not all features of an actual implementation may be described in this specification. It will of course be appreciated that in the development of any such actual embodiment, numerous implementation specific decisions must be made to achieve the specific implementation goals, which will vary from one implementation to another. Moreover, it will be appreciated that such a development effort might be complex and time consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Devices and methods in accordance with certain embodiments may be used in one or more of wireline, measurement-while-drilling (MWD) logging-while-drilling (LWD) operations and well bore drilling and reaming tools.

Figure 1:
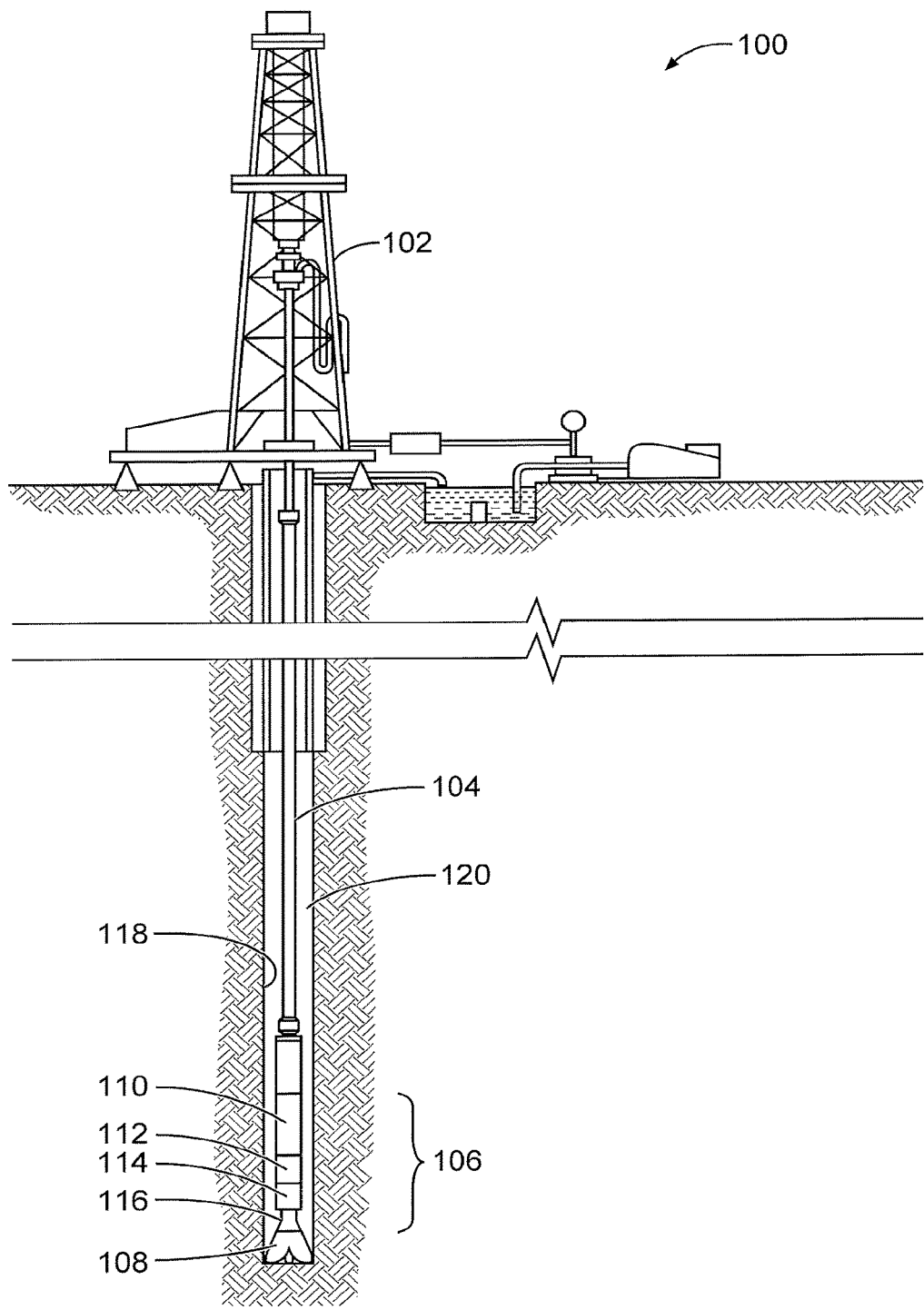
FIG. 1 is a schematic view of a general drilling system including a drill rig.

FIG. 1 depicts a conventional downhole drilling system 100 including a drill rig 102, a drill string 104 and a positive displacement motor (PDM) 106 coupled to a drill bit 108. PDM 106 forms part of a collection of downhole tools, equipment, and components disposed at the end of the drill string 104 and commonly referred to as the bottomhole assembly (BHA).

The PDM 106 generally includes a hydraulic drive 110, a bent housing 112 for steering the PDM 106, a bearing pack 114, and a drive shaft 116 coupled to the drill bit 108. During operation, drilling fluid is pumped from the rig 102 into the drill string 104. The hydraulic drive 110 converts the hydraulic energy of the pressurized drilling fluid into torsional and rotational energy that is transmitted by the driveshaft 116 to the drill bit 108. The drill bit 108 is forced into the formation by the weight of the drill string 104, commonly referred to as weight-on-bit (WOB), so that as the drill bit 108 is rotated, it removes material from the formation, creating a wellbore 118. The drilling fluid sent through the drill string 104 exits from ports in the drill hit 108 and returns to the surface via an annulus 120 defined by the wellbore 118 and the drill string 104. In addition to powering the hydraulic drive 110, the drilling fluid cools the various BHA components and carries formation cuttings to the surface.

Figure 2:
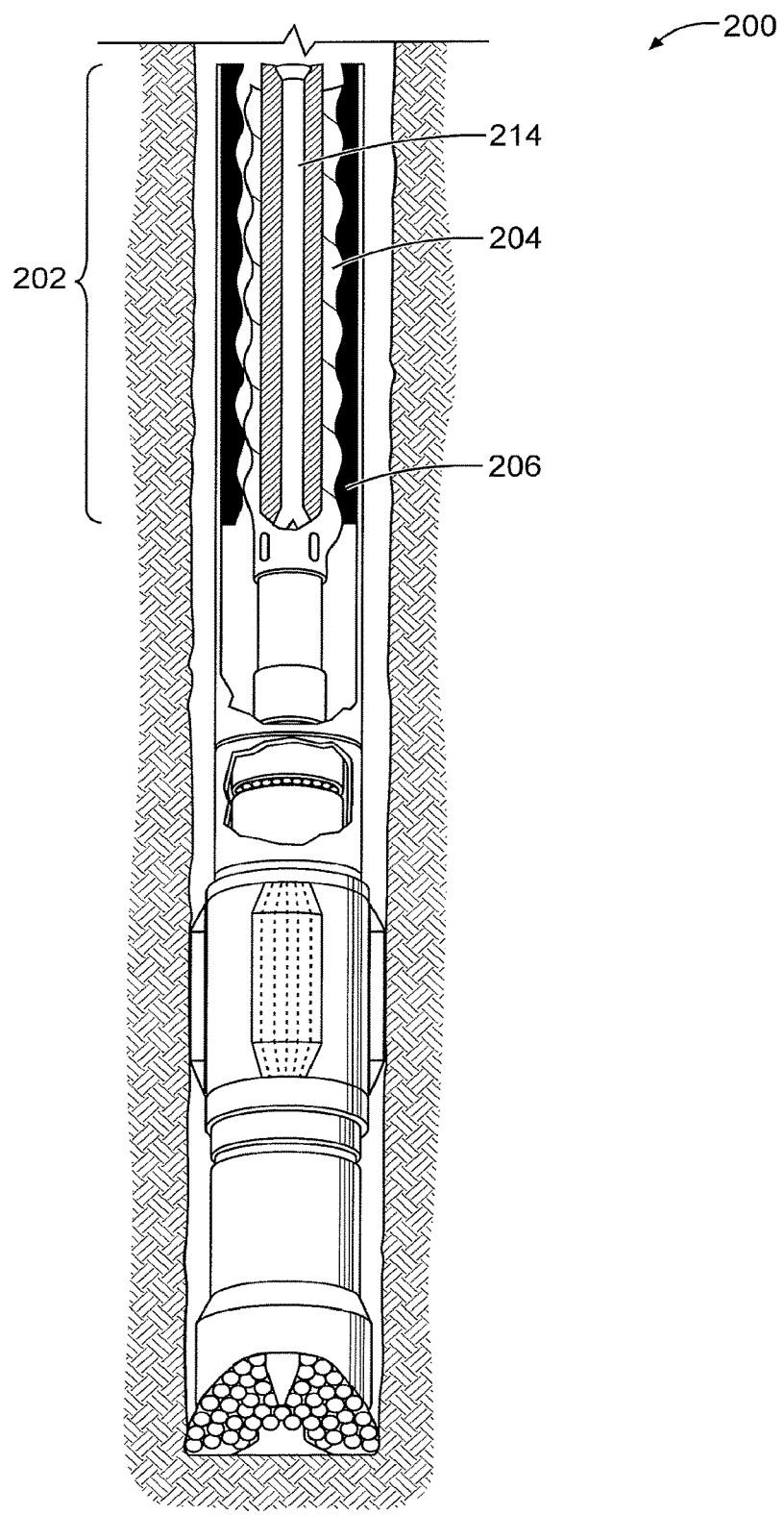
FIG. 2 is a schematic illustration of a bottom hole assembly including a cutaway showing a positive displacement drilling motor.

As depicted in FIG. 2, a PDM 200 includes a hydraulic drive 202. The hydraulic drive 202 is a progressing cavity drive that includes a helically lobed rotor 204 disposed within a stator 206. When installed, the rotor 204 is eccentric relative to the stator 206. Because of this eccentricity, a universal joint, constant-velocity (CV) joint, or similar joint capable of negating the eccentric motion of the rotor 204 may be used to couple the rotor 204 to the drive shaft. In accordance with conventional progressing cavity drives, the helically lobed rotor 204 is typically a metallic material and may be plated with chrome or a similar wear or corrosion resistant coating. The stator 206 is also commonly created from a metallic tube lined with a helically lobed elastomeric insert 208.

The rotor 204 defines a set of rotor lobes that intermesh with a set of stator lobes defined by the stator 206 and the elastomeric insert 208. The rotor 204 typically has one fewer lobe than the stator 206 such that when the rotor 204 is assembled with the stator 206 a series of cavities are formed between the rotor 204 and the stator 206. Each cavity is sealed from adjacent cavities by interference seals formed between the elastomeric insert 208 and the rotor 204.

During operation of the hydraulic drive 202, drilling fluid is pumped under pressure into one end of the hydraulic drive where it fills a first set of cavities between the stator 206 and the rotor 204. A pressure differential across adjacent cavities forces the rotor 204 to rotate relative to the stator 206. As the rotor 204 rotates inside the stator 206, adjacent cavities are opened and filled with fluid. As this rotation and filling process repeats in a continuous manner, the fluid flows progressively down the length of the hydraulic drive 202, and continues to drive the rotation of the rotor 204.

Progressing cavity drives, such as hydraulic drive 202, typically have an operational range limited by flow and pressure. If pressure or flow is too low, the forces generated by the fluid may not be sufficient to turn the rotor. On the other hand, if pressure or flow is too high, the seals between the stator and rotor may be overcome, causing the motor to stall and potentially damaging components of the PDM.

The demand for drilling fluid during drilling operations may exceed the operational range of the hydraulic drive. For example, optimum cooling of drilling components or optimum cleaning of the wellbore may require a constant flow of drilling fluid beyond the operational range. In other instances, the heightened fluid demand may be intermittent, such as an occasional increase in fluid to perform a sweep of the wellbore.

To prevent damage to the hydraulic drive 202 due to drilling fluid demand that exceeds the operational range of the hydraulic drive 202, the hydraulic drive 202 may include one or more bypasses. Bypasses provide additional flow paths for drilling fluid, thereby reducing the flow and pressure within the hydraulic drive 202 and avoiding potential stalls. A bypass may provide a flow path that circumvents the hydraulic drive completely or, as depicted in FIG. 2, a bypass bore 214 may run through the center of the helically lobed rotor 204.

In embodiments discussed in more detail below, the fluid flow or mass flow through the bypass bore 214 drives a generator for generating electrical power for downhole equipment. In other embodiments, the bypass bore 214 or a partial bore in the rotor provides a location for generators that produce power based on movement of the rotor 204 including such as shock loads, vibrations, and changes in acceleration.

Figure 3:
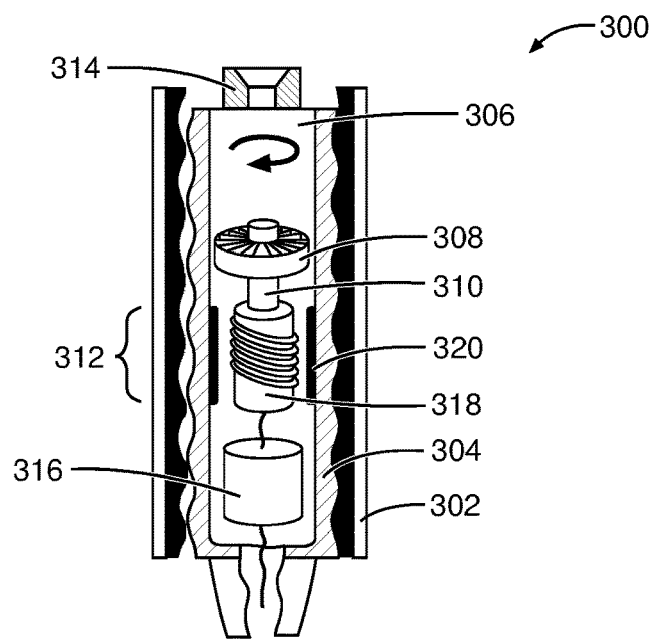
FIG. 3 is a cross-sectional view of a hydraulic drive having a turbine-based generator

One embodiment for generating power from flow through a bypass bore is depicted in FIG. 3. FIG. 3 shows a hydraulic drive 300 including a primary stator 302 and a primary rotor 304. A bypass bore 306 runs through the primary rotor 304 and provides a flow path for drilling fluids. Disposed within the bypass bore 306 is a drive used to convert the fluid flow into mechanical energy. Specifically, the drive is a turbine 308 which converts the fluid flow into rotational energy. For purposes of this embodiment, the turbine 308 may be a reaction turbine, an impulse turbine, or a design with characteristics of both reaction and impulse turbines. Similarly, the number and design of the turbine's blades or "buckets" may vary.

As fluid flows through the bypass bore 306, the turbine 308 rotates, turning a shaft 310. The shaft 310 in turn drives a generator 312 which converts the rotation of the shaft 310 into electrical energy. The generator 312 generally includes a generator rotor 318 and a generator stator 320, rotation of the rotor 318 within the stator 320 causing power to be generated by the generator 312.

The characteristics of the generator 312 may vary. For example, the number of generator poles and windings may be varied based on the specific power generation needs of a given application. In addition, various magnetic fields required for operation of the generator may be created by one or more permanent magnets or electromagnets, or a combination of permanent and electromagnets.

FIG. 3 also includes a nozzle 314 for regulating flow through the bypass bore 306. In any embodiment, the nozzle 314 may be a jet nozzle for increasing the velocity of the drilling fluid as it enters the bypass bore 306. Alternatively, the nozzle may act as a restrictor, limiting the amount of flow through the bypass bore 306 and ensuring that sufficient flow and pressure are achieved between the primary rotor 304 and primary stator 302 for operation of the hydraulic drive 300.

Although nozzle 314 is depicted in FIG. 3 as a static jet nozzle, the nozzle may be variable and capable of dynamically changing the amount of fluid permitted to flow through the bypass bore 306. For example, in some embodiments, the nozzle may include a spring-biased valve that remains closed until sufficient hydrostatic pressure to operate the hydraulic drive is achieved. Examples of spring-based nozzles that may be used to control flow through the bypass bore can be found in U.S. Pat. No. 7,757,781 to Hay et al. In addition to spring-based nozzles, the nozzle may be electrically or hydraulically actuated and may use power generated by the generator 312 for actuation and control.

Figure 4:
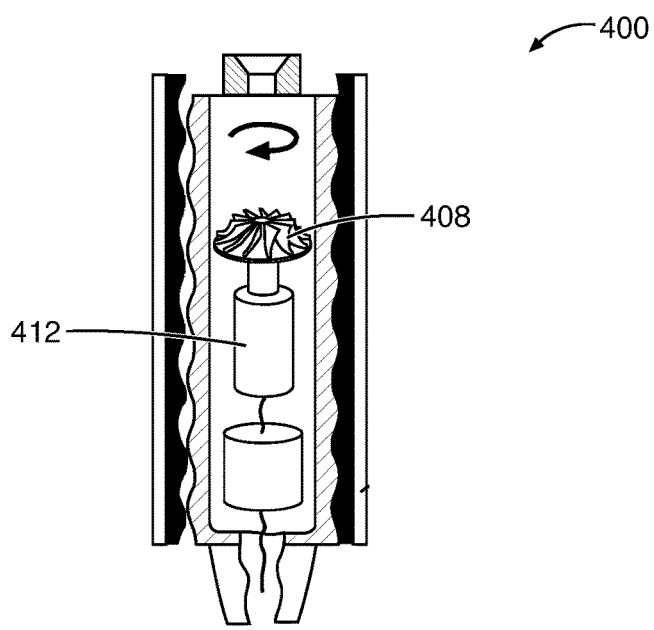
FIG. 4 is a cross-sectional view of a hydraulic drive having an impeller-based generator.

FIG. 4 depicts a hydraulic drive 400 in which the means for converting the fluid flow into mechanical energy is an impeller 408. Similar to the previous turbine embodiment, the impeller 408 converts energy from fluid flowing through the hydraulic drive into rotational energy and can be any suitable impeller design known in the art. Hydraulic drive 400 also includes a generator 412.

As depicted in FIG. 4, the generator 412 may be a self-contained generator with the generator stator and rotor enclosed in a housing. Alternatively, as previously depicted in FIG. 3, the generator 312 may be configured such that the generator stator 320 is mounted on an inside surface of the primary rotor 304.

Figure 5A:
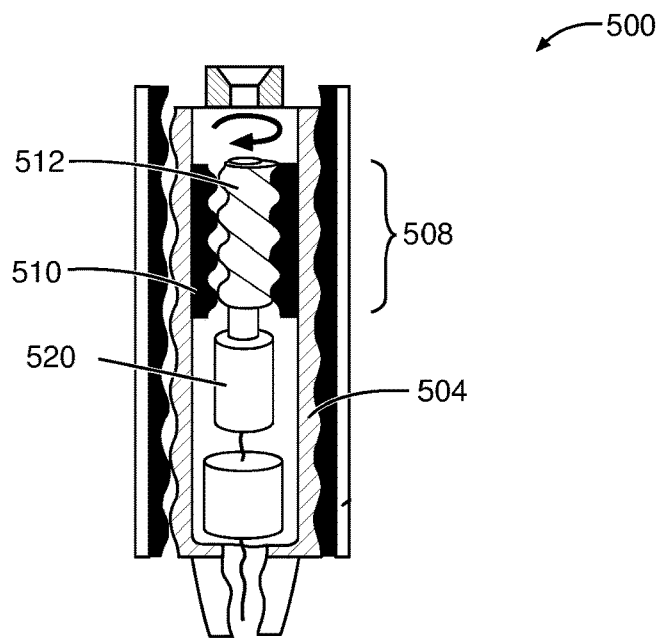
FIG. 5A is a cross-sectional view of a hydraulic drive having a progressing cavity-based generator.
Figure 5B:
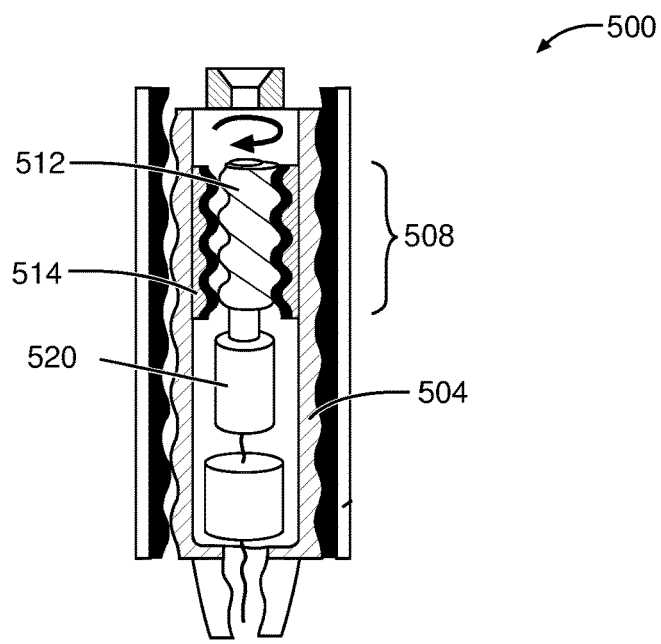
FIG. 5B is a cross-sectional view of a hydraulic drive having an alternative type of progressing cavity-based generator.

FIG. 5A-B depict another embodiment of a hydraulic drive 500 in which a secondary progressing cavity drive 508 is disposed within the primary rotor 504 and drives a generator 520. The secondary progressing cavity drive 508 includes a secondary helically lobed rotor 512 and a secondary stator 510. In the embodiment depicted in FIG. 5A, the secondary stator 510 is an elastomer stator having an internal surface with a series of helical lobes. In another embodiment depicted in FIG. 5B, a secondary stator 514 is formed by applying an elastomer layer to a base structure. The elastomer layer and base structure combine to create an internal surface with a series of helical lobes. The base structure may be formed as part of the primary rotor 504 or may be a separate component inserted into the primary rotor 504.

In FIGS. 5A-B, the secondary helically lobed rotor 512 is disposed within the secondary stator 510, 514 forming cavities between the lobes of the secondary stator and the secondary rotor 512. As drilling fluid enters the hydraulic drive 500, the fluid flows through the passages between the secondary stator 510, 514 and the secondary rotor 512, rotating the secondary rotor relative to secondary stator 510, 514 and driving the generator 520.

The above embodiments are intended only to illustrate some structures suitable as drives for a generator. Embodiments may include any drive suitable for converting the energy of the fluid flowing through the primary rotor bore into mechanical energy for running an electrical generator. Although the above embodiments each include drives that rotate about an axis substantially parallel to a longitudinal axis of the rotor and bypass, other embodiments may include arrangements in which the axis of rotation of the drive is substantially perpendicular to the longitudinal axis. By way of example, such embodiments may include drives based on vane motors, gear motors, or peristaltic motors.

Embodiments may also include generators that rely on reciprocating motion instead of rotational motion to generate electricity. For example, the generator may include a magnet that reciprocates through a wire coil to generate electricity. To obtain linear motion for the generator, a drive based on a linear reciprocating piston pump or rotating barrel-cam design may be used.

Electricity may also be generated by converting the kinetic energy of the flowing fluid into electrical energy by way of the piezoelectric effect. Piezoelectric materials produce electric charge when stress is applied to them and may be used in a device to produce electrical power from a flowing fluid. Specifically, the flowing fluid may be diverted to apply varying threes to a piezoelectric member, thereby generating electricity. One such device that may be used in an embodiment of the present invention is described in U.S. Pat. No. 6,011,346 to Buchanan et al.

In other embodiments, power may be generated by using magnetorestrictive materials. When strain is induced in a magnetorestrictive material, a corresponding change in a magnetic field about the material occurs. The change of the magnetic field can then be used to induce current in a conductor, producing electricity. One such device that may be incorporated into an embodiment of the present invention is described in PCT/US Application No. 2012/027898 to Hay, et al.

Figure 6:
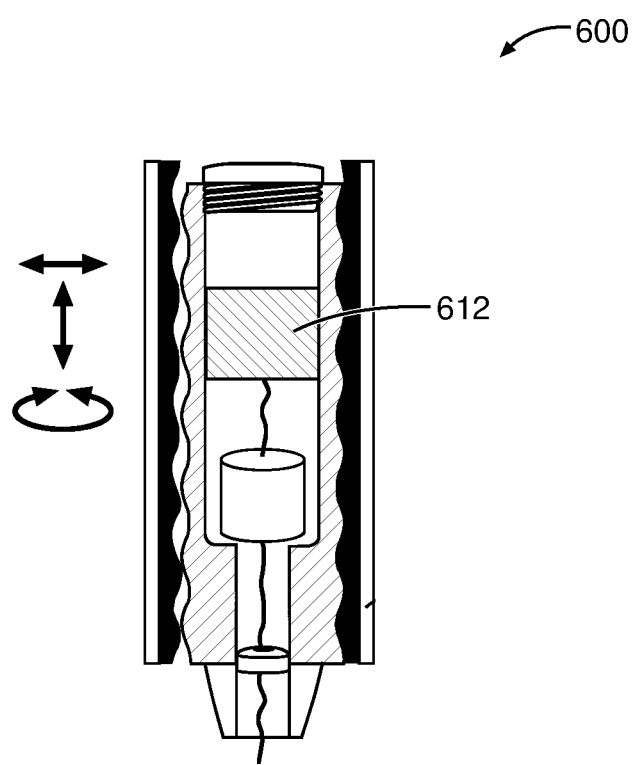
FIG. 6 is a cross-sectional view of a hydraulic drive having a generator for generating electricity based on kinetic energy of the drilling motor.

FIG. 6 is a schematic illustration of a hydraulic drive 600 in which electrical energy is produced by harnessing the kinetic energy of the hydraulic drive 600. During drilling operations, the hydraulic drive 600 experiences forces in the form of shock loading and vibrations due to, among other things, interactions between the drill bit and formation, interactions between the BHA and the formation, and operation of other downhole drilling tools. The hydraulic drive 600 may also experience periods of acceleration or deceleration due to changes in formation resistance, changes in the flow rate of drilling fluid, changes to the drill string rotational speed, and other factors.

To harness changes in the movement of the drive 600 caused by these forces, a kinetic generator 612 may be disposed within the hydraulic drive 600. The kinetic generator 612 is coupled to the hydraulic drive 600 such that at least some of the forces experienced by the hydraulic drive 600 are transmitted to the kinetic generator 612. The kinetic generator 612 may include a flywheel, oscillating weight, cantilevered beam, or other structure that moves in response to forces experienced by the hydraulic drive 600 and that in turn is used to drive the kinetic generator 612.

The electrical power produced by the various embodiments in this disclosure may be used to power various tools and downhole equipment. The following examples are not intended to limit the scope of this disclosure, but are only meant to illustrate some of the wide range of downhole equipment that may be powered using the system disclosed herein. In any embodiment, the electrical power may be used to power sensors for measuring parameters of the drilling unit such as WOB, drill bit revolutions-per-minute, torque, differential pressures between various components, and vibration or shock. The electrical power may also be used for measuring parameters of the wellbore or formation such as pressure, temperature, or resistivity, or to actuate pieces of downhole equipment such as control valves or ports.

Any embodiment may include power electronics for processing the generated power to meet the specific power requirements of the downhole equipment. For example, the power electronics may include a rectifier for converting alternating current to direct current. The power electronics may also include one or more regulators or transformers for regulating or modifying voltage. A battery or other power storage medium for storing the generated power may also be included to provide backup power or power for use when the drilling motor is not in operation. The power electronics may be located within the rotor. For example, power electronics package 316 in FIG. 3 is shown as being located within rotor 304. In other embodiments, the power electronics may be located in a different section of the PDM or BHA and electrically connected to the in-rotor generator.

Although numerous characteristics and advantages of embodiments of the present invention have been set forth in the foregoing description and accompanying figures, this description is illustrative only. Changes to details regarding structure and arrangement that are not specifically included in this description may nevertheless be within the full extent indicated by the claims.

What is claimed is:

1. An apparatus for generating electricity, comprising:
   a drilling motor, comprising
      a stator;
      a rotor operable to rotate within the stator with passage of a drilling fluid through the drilling motor, the rotor comprising a bore that runs through the rotor, the bore comprising an inlet and an outlet, wherein the inlet, the bore, and the outlet define a flow path for the drilling fluid to flow through the rotor; and
      a secondary progressing cavity drive disposed within the rotor, wherein the secondary progressing cavity drive comprises a secondary rotor disposed within a secondary stator;
   a generator disposed at least partially within the bore, wherein the drilling fluid flowing through one or more passages between the secondary stator and the secondary rotor rotates the secondary rotor relative to the secondary stator to drive the generator to generate the electricity.

2. The apparatus of claim 1 wherein the inlet comprises a nozzle for regulating the flow of drilling fluid through the rotor.

3. The apparatus of claim 2 wherein the nozzle dynamically changes the drilling fluid permitted to flow through the bore.

4. The apparatus of claim 1, wherein the generator comprises at least one of a piezoelectric generator and a magnetorestrictive generator.

5. The apparatus of claim 1 wherein
the generator comprises a generator rotor within a generator stator, wherein the generator generates power by rotation of the generator rotor within the generator stator.

6. The apparatus of claim 5 wherein
a movement of the rotor is at least one of rotational acceleration or deceleration.

7. A method for generating electricity, comprising
disposing a secondary progressing cavity drive within a rotor of a drilling motor, wherein the secondary progressing cavity drive comprises a secondary rotor disposed within a secondary stator;
disposing a generator at least partially within a bore that runs through the rotor, wherein the bore comprises an inlet and an outlet that define a flow path for a drilling fluid to flow through the rotor; and
operating the drilling motor, wherein operating the drilling motor comprises driving the generator by flowing the drilling fluid through one or more passages between the secondary stator and the secondary rotor to thereby rotate the secondary rotor relative to the secondary stator to drive the generator to generate the electricity.

8. The method of claim 7, wherein
the generator comprises a generator rotor within a generator stator, wherein the generator generates the electricity by rotation of the generator rotor within the generator stator.

9. The method of claim 7 further comprising
converting the electricity generated by the generator into a form usable by downhole equipment.

* * * * *